US008171412B2

(12) United States Patent
Sand et al.

(10) Patent No.: US 8,171,412 B2
(45) Date of Patent: May 1, 2012

(54) CONTEXT SENSITIVE TEXT RECOGNITION AND MARKING FROM SPEECH

(75) Inventors: Anne R. Sand, Peyton, CO (US); Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 11/421,601

(22) Filed: Jun. 1, 2006

(65) Prior Publication Data
US 2007/0283270 A1  Dec. 6, 2007

(51) Int. Cl.
G06F 3/00 (2006.01)
G06F 3/13 (2006.01)

(52) U.S. Cl. .................. 715/730; 715/728; 704/251

(58) Field of Classification Search .......... 715/727–730, 715/802, 817, 821–824, 732; 704/275, 246, 704/251–252
See application file for complete search history.

(56) References Cited

U.S. PATENT DOCUMENTS

| | | | |
|---|---|---|---|
| 5,550,966 A | 8/1996 | Drake et al. | |
| 5,634,018 A * | 5/1997 | Tanikoshi et al. | 715/751 |
| 5,634,086 A | 5/1997 | Rtischev et al. | |
| 5,809,469 A * | 9/1998 | Goldstein et al. | 704/270 |
| 5,819,225 A * | 10/1998 | Eastwood et al. | 704/275 |
| 6,397,180 B1 * | 5/2002 | Jaramillo et al. | 704/252 |
| 6,651,176 B1 * | 11/2003 | Soltis et al. | 713/300 |
| 6,718,308 B1 | 4/2004 | Nolting | |
| 6,754,631 B1 * | 6/2004 | Din | 704/270 |
| 7,010,490 B2 * | 3/2006 | Brocious et al. | 704/275 |
| 7,487,451 B2 * | 2/2009 | Bodin et al. | 715/728 |
| 7,496,845 B2 * | 2/2009 | Deutscher et al. | 715/726 |
| 2002/0099549 A1 | 7/2002 | Nguyen | |
| 2002/0193994 A1 * | 12/2002 | Kibre et al. | 704/260 |
| 2003/0122863 A1 * | 7/2003 | Dieberger et al. | 345/730 |
| 2004/0193420 A1 | 9/2004 | Kennewick et al. | |
| 2004/0193426 A1 | 9/2004 | Maddux et al. | |
| 2005/0021343 A1 * | 1/2005 | Spencer | 704/275 |
| 2005/0038660 A1 | 2/2005 | Black et al. | |
| 2005/0131703 A1 | 6/2005 | Bodin et al. | |
| 2007/0218432 A1 * | 9/2007 | Glass et al. | 434/156 |

OTHER PUBLICATIONS

Franklin et al., "Beyond 'Next slide, please': The use of content and speech in multi-modal control", In Working Notes of the AAAI-99 Workshop on Intelligent Information Systems, 1999.*
Tsutsui et al., "MPML: A Multimodal Presentation Markup Language with Character Agent Control Functions", Proceedings of the (CD-ROM) WebNet 2000 World Conference on the WWW and Internet, San Antonio, Texas.*

* cited by examiner

Primary Examiner — William Bashore
Assistant Examiner — Andrew Tank
(74) Attorney, Agent, or Firm — Andrea Bauer; Hoffman Warnick LLC

(57) ABSTRACT

A visual presentation system and method for synchronizing presentation data being viewed in a display with speech input. A system is disclosed that includes: a speech recognition system for recognizing speech input; an association system for determining a context of the speech input and matching the context with a relevant portion of the presentation data; and a visual coordination system for coordinating the display of a data item from the presentation data based on a match made by the association system.

22 Claims, 2 Drawing Sheets

CONTEXT SENSITIVE TEXT RECOGNITION AND MARKING FROM SPEECH

FIELD OF THE INVENTION

The invention relates generally to speech recognition applications, and more particularly, to a system and method for identifying textual passages in a display utilizing context sensitive speech recognition.

BACKGROUND OF THE INVENTION

In many instances, visual information is provided to supplement or enhance spoken words during a presentation. For instance, during a speech or presentation, the speaker may utilize a visual presentation system, such as MICROSOFT POWER POINT®, to visually enhance what is being discussed. Typically, the speaker uses a pointer or some other device to visually mark the presentation to keep the audience focused on the current bulleted topic. Visual marking of current location is conventionally done with a laser pointer or with the use of progressively displayed slides. In some visual presentation applications, such as "Web-casting" software, the speaker can use a "virtual" laser pointer or highlighter on the computer. This is often accomplished by manually controlling the mouse pointer to indicate a current topic.

Unfortunately, situations arise where it difficult for the speaker to remain synchronized with the visual presentation. For instance, the speaker is required to manually move from page to page, often skipping forward to later topics and then back to earlier topics. In these situations, the speaker, as well as the audience, has to remember which topics have been covered and which have not. In other cases, the speaker may be holding a physical object or operating a device that renders his or her hands unavailable for finding or marking a location in the visual presentation. Because of the reliance of manual marking devices to synchronize visual presentations with oral presentations, present day visual presentation systems incorporate inherent limitations for the presenter.

Accordingly, a need exists for a visual presentation system that does not require manual intervention to synchronize a visual presentation with spoken information.

SUMMARY OF THE INVENTION

The present invention addresses the above-mentioned problems, as well as others, by providing a visual presentation system that automatically synchronizes visual presentation data with spoken information.

In a first aspect, the invention provides a visual presentation system for synchronizing presentation data being viewed in a display with speech input, comprising: a speech recognition system for recognizing speech input; an association system for determining a context of the speech input and matching the context with a relevant portion of the presentation data; and a visual coordination system for coordinating the display of a data item from the presentation data based on a match made by the association system.

In a second aspect, the invention provides a method for synchronizing presentation data being viewed in a display with speech input, comprising: capturing a speech input; providing a speech recognition system to recognize the speech input; determining a context of the speech input; matching the context with a relevant portion of the presentation data; and coordinating the display of a data item from the presentation data based on the matching step.

In a third aspect, the invention provides a computer program product stored on a computer useable medium for synchronizing presentation data being viewed in a display with speech input, comprising: program code configured for determining a context of a speech input; program code configured for matching the context with a relevant portion of the presentation data; and program code configured for coordinating the display of the presentation data based on a match with the relevant portion of the presentation data.

In a fourth aspect, the invention provides a method for deploying a system synchronizing presentation data being viewed in a display with speech input, comprising: providing a computer infrastructure being operable to: determine a context of a speech input; match the context with a relevant portion of the presentation data; and coordinate the display of the presentation data based on the matching.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
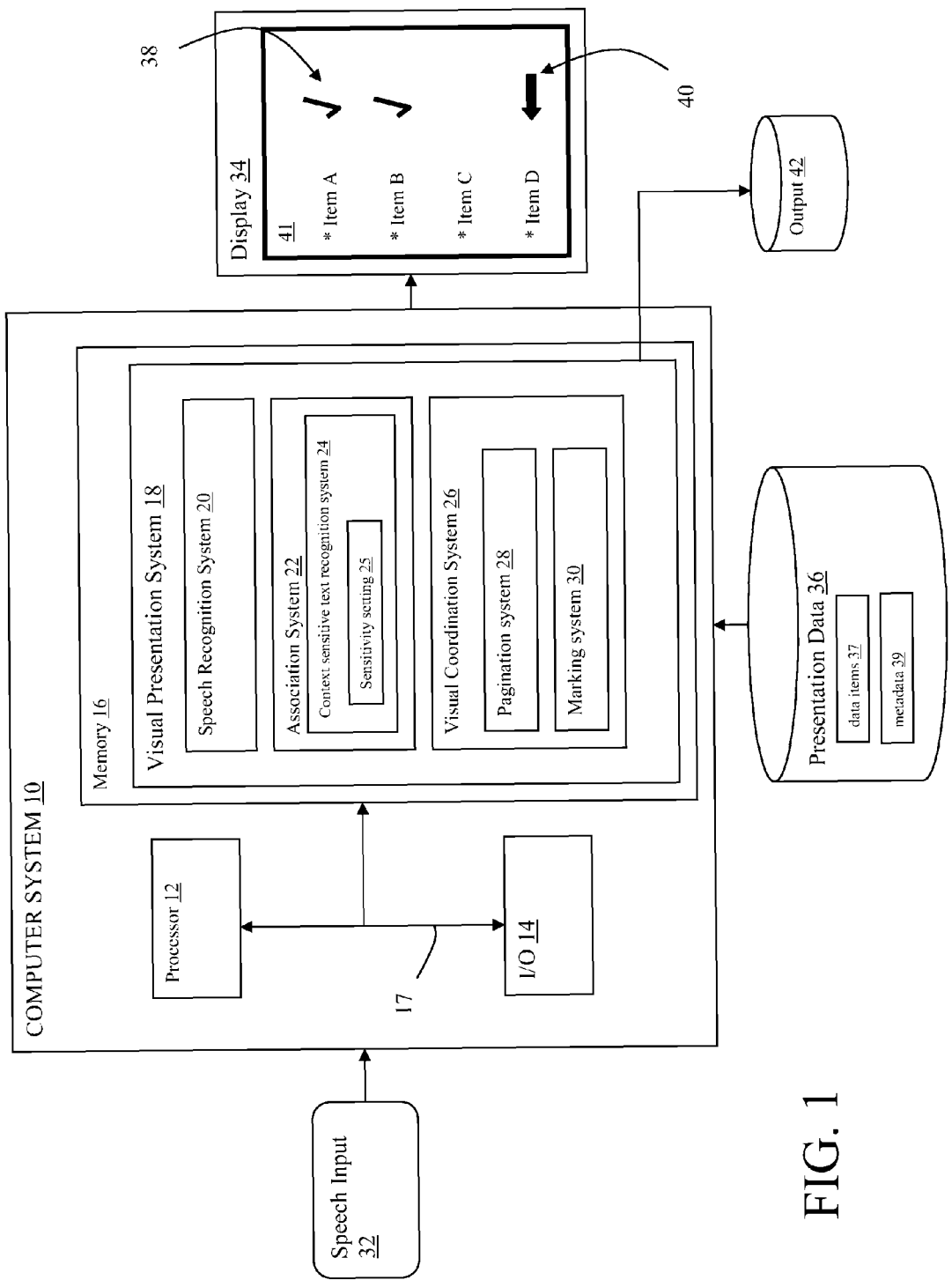
FIG. 1 depicts a computer system having a visual presentation system in accordance with an embodiment of the present invention.

As noted above, it is often the case where a presentation is comprised of both an oral presentation (e.g., a speech) and a visual presentation (e.g., a PowerPoint). The present invention provides, among other things, a system and method for allowing the visual presentation to automatically track the oral presentation without the need for direct manual intervention by the presenter. Referring to the drawings, FIG. 1 depicts an illustrative embodiment for implementing such a system. In particular, FIG. 1 depicts a computer system 10 having a visual presentation system 18 that: (1) allows presentation data 36 to be shown on display 34; (2) utilizes a context sensitive text recognition system 24 to match relevant portions of the presentation data 36 with the speech input 32; and (3) selects and/or marks relevant portions of the presentation data 36 within a display 34.

As noted above, systems for generating a visual presentation from a set of presentation data 36 are well known in the art (e.g., PowerPoint, Web casting, electronic books, etc.), and all such systems fall within the scope of this invention. Similarly, display devices for displaying presentation data 36 (e.g., computer monitors, projectors, TVs, hand held devices, etc.) are also well known in the art and as such fall within the scope of this invention.

However, in addition to the above functionality, the visual presentation system 18 of the present invention includes: a speech recognition system 20 that recognizes speech, e.g., by converting the speech input 32 into a set or stream of textual data; an association system 22 that matches information found in the presentation data 36 (e.g., data items 37, metadata 39, location data, etc.) with textual data from the speech input 32; and a visual coordination system 26 that causes relevant portions of the presentation data 36 (e.g., matched data items, locations, sections, pages, etc.) to be displayed and/or marked in display 34.

Speech recognition system 20 may comprise any now known or later developed technology for recognizing speech, e.g., by converting speech input 32 into textual data. Known systems include, e.g., VIA VOICE®, DRAGON NATURALLY SPEAKING®, etc.

As noted, association system 22 matches the textual data generated from the speech recognition system 20 with relevant portions (data items 37, metadata 39, location data, etc.) of the presentation data 36. To achieve this, association system 22 includes a context sensitive text recognition system 24 that analyzes the textual data from the speech input 32 to identify a "context" of the speech input 32. Any now known or later developed system may be used to extract the context from the speech input 32. For instance, context sensitive text recognition system 24 may look for key words or phrases, the repetition of related words or phrases, the volume or speed at which words or phrases are spoken, commands, etc., in order to determine the context of the textual data. It should be recognized that the structure of the identified "context" may be implemented or described in any manner, e.g., a set of terms, as a single term, a phrase, a data object, a class, etc.

Once the context of the textual data is identified, association system 22 can perform a search of the presentation data 36 to identify data items 37 that "match" the context. Any system could be utilized to perform the matching operation, including, e.g., relational database searches, fuzzy logic, etc. For instance, context sensitive text recognition system 24 may identify terms, such as "advantages" and "ASIC devices" as the context of the speech input 32, and then look for data items 37 that match the context. It should be noted that data items 37 may comprise any type of information, including textual, visual, multimedia, etc.

In addition, presentation data 36 may also include metadata 39 to assist in the matching process. Metadata 39 may include any type of information that describes information in the presentation data 36 and can be utilized to enhance the synchronization of the speech input 32 with the presentation data 36. For example, metadata may include predefined or user defined words, phrases or cues that are associated with different data items 37, or location points in the presentation. For instance, the metadata term <"first point"> could be associated with the first data item in a slide. Accordingly, if the presenter uttered the phase "the first point I would like to make . . . ," then the association system 22 could readily match the textual data with a corresponding data item 37 using the stored metadata term <"first point">. Other types of metadata may include page numbers, topics, key words, user commands, etc.

Note that the presentation data 36 may be preprocessed by the visual presentation system 18 to improve the matching process. For instance, unimportant words such as "and, the, a, etc." could be removed, while other words and phrases may be ranked by importance such that more important words can be located quicker.

Also note that the identification of the context and the matching of the context to a relevant portion of the presentation data 36 may be implemented in a dynamic ongoing fashion. For instance, textual data can be streamed into a buffer that is regularly analyzed, e.g., at regular time intervals "T seconds," for a context. Thus, every T seconds a new context can be identified, which can in turn result in a new match to a different portion of the presentation data 36.

In addition, context sensitive speech recognition system 24 may include a sensitivity setting 25 that controls the process of identifying the context and/or the match. For instance, sensitivity setting 25 may dictate a frequency (i.e., number of times) a word or phrase must be spoken before context sensitive speech recognition system 24 determines a context.

Once a match is identified, visual coordination system 26 then coordinates how the presentation data 36 is to be displayed in display 34. In one illustrative embodiment, a pagination system 28 may be utilized to pull up a relevant location, e.g., a view, a word, a phrase, a text segment, a graphic object, a visual element, a section, a slide, a page, etc., from the presentation data 36. In a further illustrative embodiment, a marking system 30 may be utilized to mark (e.g., highlight, select, etc.) data items 37 being shown in the display 34. For instance, as shown in display 34, a set of data items 41 are displayed that include Items A, B, C and D. In this illustrative embodiment, the data item (Item D) currently being discussed by the presenter is marked (or highlighted) with an arrow 40. Items that were already discussed (Items A and B) are marked with check marks 38. Obviously, the types of markings used to identify current or past data items 37 being discussed can vary without departing from the scope of the invention.

In addition, the visual coordination system 26 could be configured to either select/display a single match, or select/display multiple matches. For instance, association system 22 may determine that there are multiple possible matches from the presentation data 36 for a particular context discovered from the speech input 32. In this case, each match could be displayed, and the user could select the best match. In another embodiment, the association system 22 may simply decide the best match.

Finally, visual presentation system 18 may include a facility for saving an output 42 of the presentation. The output 42 may include a record of the speech, e.g., showing each context that was discovered, matches, the order in which items in the presentation were mentioned, etc.

In general, computer system 10 may comprise any type of computing device or devices. Moreover, computer system 10 could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, speech recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

Figure 2:
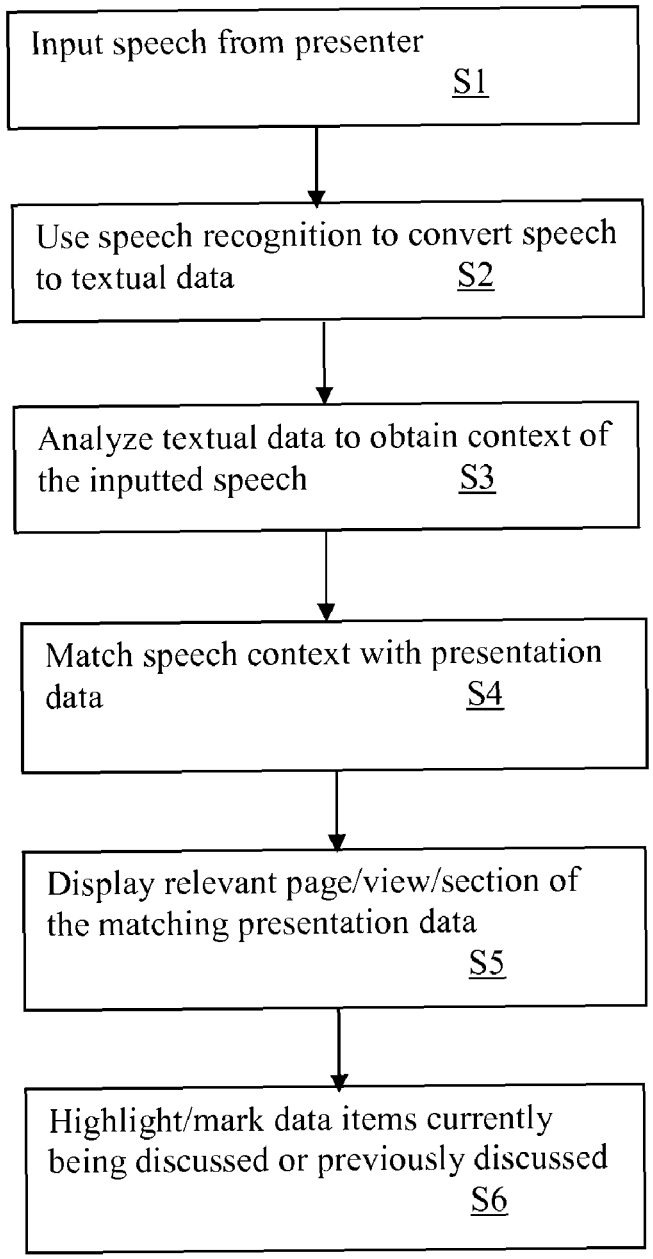
FIG. 2 depicts a flow diagram of a method of implementing an embodiment of the present invention.

Referring now to FIG. 2, a flow diagram of an illustrative embodiment of implementing the visual presentation system 18 of FIG. 1 is shown. First, at step S1, speech is inputted from the presenter. At step S2, a speech recognition system 20 is utilized to convert the speech to textual data. At step S3, the textual data is analyzed to obtain a context of the inputted speech. Next, an attempt is made to match the context with data items 37 or metadata 39 in the presentation data 36 at step S4. If a match occurs, the relevant location (e.g., page, section, view, slide) of the presentation data 36 is displayed at step S5. At step S6, data items 37 being displayed are highlighted and/or marked to indicate a current item being discussed and/or items previously discussed. The process then repeats to continuously analyze inputted speech to dynamically synchronize the changing context with the presentation data.

Various illustrative applications for the visual presentation system 18 described herein are provided as follows:

Scenario A

In a live presentation, a speaker may be talking along with an outline or PowerPoint slides. The speaker may cover items from the outline in more detail than that which is shown on the visual presentation. As a visual cue to the speaker (not necessarily visible to the audience), the visual presentation system 18 marks off sections of the outline as the speaker discusses points, providing a means to see whether the desired content has been discussed. This allows the speaker to visually see his or her position, covering material in any order desired, and skip other/minor points that the speaker chooses not to for reasons of time constraints, visual-only impact, etc.

Scenario B

In a live presentation, a speaker may be talking along with an outline or PowerPoint slides. The speaker may be covering items from the outline in more detail that that which is shown on the presentation. As a visual cue to the audience (e.g., local or distributed), the visual presentation system 18 displays a current pointer or highlight on the data item under discussion by the speaker by matching the spoken verbiage against the outline. As the speaker progresses through the outline, the pointer moves to the current item, and may indicate when a topic has already been covered through an attribute modification (i.e., marking) on covered items (e.g., color change, checkmark, shading, etc.). Upon reaching the end of material on a page, the visual presentation system 18 could advance to the following page based on complete coverage of material and/or user configurable parameters.

Scenario C

A veterinary pathologist may be performing a necropsy on an animal, such that his hands and arms are contaminated with blood and tissue. He cannot use them to operate a computer or turn pages in a book. Instead, the pathologist could have a computer 10 with the visual presentation system 18 of the present invention within his sight but out of the way of the mess. This computer 10 could have an on-line pathology text or reference loaded on it (i.e., presentation data 36). The pathologist could speak words that would find the right place within the text to correspond to the information or instructions he needs, and would display the text he needs to see at any given time.

Scenario D

In a classroom a teacher and students may all have their hands occupied fixing a mechanical object. Assume that a large 500-page manual (i.e., presentation data 36) exists on-line for this mechanical object. The teacher could index and find a particular place in the manual by talking about a related topic. The visual presentation system 18 would visually mark this place, allowing users to focus on their task and the learning, not on finding the correct place in the manual. The teacher could have one copy of the on-line manual projected on a screen. Alternately, each user could have a separate copy of this manual on his or her own PC. The system would be able to mark the correct place on each user's PC.

Scenario E

A soldier in the battlefield trying to fix a tank may have an electronic copy of a manual for the tank (i.e., presentation data 36) on a laptop. If the soldier is not an experienced technician, he could remotely communicate with a technician to help in the repair. As the technician orally references different pages in the manual, the soldier can see the text that is being highlighted automatically as the technician speaks.

It should be appreciated that the teachings of the present invention could also be offered as a business method on a subscription or fee basis. For example, a computer system 10 comprising a visual presentation system 18 could be created, maintained and/or deployed by a service provider that offers the functions described herein for customers. That is, a service provider could offer to provide a system for synchronizing visual and oral data as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A visual presentation system for synchronizing a display of a set of presentation with a speech input of a speaker, the system comprising:
    a speech recognition system for processing the speech input of the speaker during a visual presentation,
    wherein the processing of the speech input of the speaker includes converting the speech input into a spoken information data set;
    an association system for processing the spoken information data set to determine a display order of portions of the set of presentation data,
    wherein relevant portions of the set of presentation data are displayed in an order based upon the speech input of the speaker,
    wherein the processing of the spoken information data set includes:
        preprocessing the set of presentation data to exclude a predetermined list of terms from consideration in a presentation data match determination;
        determining a context of the speech input by analyzing speech patterns in the speech input over a predetermined time interval; and
        determining a set of matches of the context with the relevant portions of the set of presentation data; and
    a visual coordination system for coordinating the display of the relevant portions of the set of presentation data based on the set of matches determined by the association system,
    wherein the coordinating of the display of the relevant portions includes adjusting the display order of the relevant portions to synchronize the visual presentation with the speech input, and
    wherein the visual coordination system includes a user selection system for allowing a user to select which of the relevant portions to display from among the set of matches during the visual presentation.

2. The visual presentation system of claim 1, wherein the association system includes a system for controlling a sensitivity for determining the context.

3. The visual presentation system of claim 1, wherein the preprocessing is performed prior to the beginning of the visual presentation and the relevant portion of the set of presentation data is selected from the group consisting of: data items, metadata and location data.

4. The visual presentation system of claim 1, wherein the context is-determined based on a frequency, volume or speed of an uttered set of words in the speech input.

5. The visual presentation system of claim 1, wherein the visual coordination system selects and displays locations within the set of presentation data, wherein the locations are displayed independently to an audience on an audience display and the user on a user display and are selected from the group consisting of: a view, a word, a phrase, a text segment, a graphic object, a visual element, a section, a slide, and a page.

6. The visual presentation system of claim 1, wherein the visual coordination system further includes a system for marking data items and saving an output of the presentation.

7. The visual presentation system of claim 6, wherein the visual coordination system includes a marking selected from the group consisting of:
    a first type of marking for visually identifying a data item in the display that is yet to be discussed;
    a second type of marking for visually identifying a data item in the display currently being discussed; and
    a third type of marking for visually identifying a data item in the display that was previously discussed.

8. A method for synchronizing a display of a set of presentation data with a set of speech inputs of a speaker, the method comprising:
    preprocessing the set of presentation data to exclude a predetermined list of terms from consideration in a presentation data match determination;
    capturing a speech input of the speaker during a visual presentation;
    providing a speech recognition system to process the speech input,
    wherein the processing of the speech input includes converting the speech input into a spoken information data set;
    determining a context of the speech input based on the spoken information data set,
    wherein the context is determined in response to a word or a phrase being recognized a predetermined plurality of times over a predetermined time interval;
    matching the context with a relevant portion of the set of presentation data; and
    coordinating the display of the relevant portion of the set of presentation data based on the matching,
    wherein the coordinating of the display of the relevant portion includes automatically adjusting the display of the relevant portion to synchronize the visual presentation with the speech input.

9. The method of claim 8, wherein the predetermined plurality of times is adjustable via a sensitivity control.

10. The method of claim 8, wherein the preprocessing is performed prior to the beginning of the visual presentation and the relevant portion of the set of presentation data is selected from the group consisting of: data items, metadata, and location data.

11. The method of claim 8, wherein the context is determined based on a frequency, volume or speed of an uttered set of words in the speech input.

12. The method of claim 8, wherein the coordinating step selects and displays locations within the set of presentation data, wherein the locations are displayed independently to an audience on an audience display and the user on a user display and are selected from the group consisting of: a view, a word, a phrase, a text segment, a graphic object, a visual element, a section, a slide, and a page.

13. The method of claim 8, wherein the coordinating step further includes marking data items and saving an output of the presentation.

14. The method of claim 13, wherein the coordinating step includes a step selected from the group consisting of:
    using a first type of marking for visually identifying a data item in the display that is yet to be discussed;
    using a second type of marking for visually identifying a data item in the display currently being discussed; and
    using a third type of marking for visually identifying a data item in the display that was previously discussed.

15. A computer program product stored on a computer useable medium for synchronizing a display of a set of presentation data with a set of speech inputs of a speaker, the program product comprising:
    program code configured to preprocess the set of presentation data to exclude a predetermined list of terms from consideration in a presentation data match determination;
    program code configured for determining a context of a speech input over a predetermined time interval, wherein the context is determined by analyzing speech patterns in the speech input of the speaker over the predetermined time interval;

program code configured for matching the context with a plurality of the relevant portions of the set of presentation data; and program code configured for coordinating the display of the relevant portions of the set of presentation data during a visual presentation based on the matching, wherein the coordinating of the display of the relevant portions includes automatically adjusting the display of the relevant portions to synchronize the visual presentation with the speech input.

16. The computer program product of claim 15, wherein the program code for determining the context is adjustable via a sensitivity control.

17. The computer program product of claim 15, wherein the preprocessing is performed prior to the beginning of the visual presentation and the relevant portion of the set of presentation data is selected from the group consisting of: data items, metadata, and location data.

18. The computer program product of claim 15, wherein the context is determined based on a frequency, volume or speed of an uttered set of words in the speech input.

19. The computer program product of claim 15, wherein the program code configured for coordinating the display of the presentation data selects and displays a plurality of matching data items, and provides a user selection system for allowing a user to select which relevant portions to display.

20. The computer program product of claim 15, wherein the program code configured for coordinating the display of the presentation data automatically selects which relevant portions to display from the plurality of matches.

21. The computer program product of claim 20, wherein the program code configured for coordinating the display of the presentation data includes a function selected from the group consisting of:

using a first type of marking for visually identifying a data item in the display that is yet to be discussed;

using a second type of marking for visually identifying a data item in the display currently being discussed; and using a third type of marking for visually identifying a data item in the display that was previously discussed.

22. A method for deploying a system synchronizing a display of a set of presentation data with a set of speech inputs of a speaker, the method comprising:

providing a computer infrastructure being operable to:

preprocess the set of presentation data to exclude a predetermined list of terms from consideration in a presentation data match determination;

determine a context of a speech input over a predetermined time interval, wherein the context is determined in response to a word or phrase being recognized a predetermined plurality of times over the predetermined time interval;

match the context with a relevant portion of the set of presentation data; and coordinate the display of the set of presentation data based on the matching step, including displaying the relevant portion of the set of presentation data, wherein the coordinating of the display of the relevant portion includes automatically adjusting the display of the relevant portion to synchronize a visual presentation with the speech input.

* * * * *